Jan. 19, 1932.   A. RENSHAW   1,842,117
TRANSMISSION CHAIN
Filed June 21, 1928   2 Sheets-Sheet 1
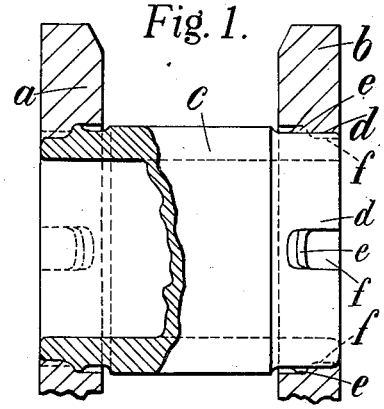
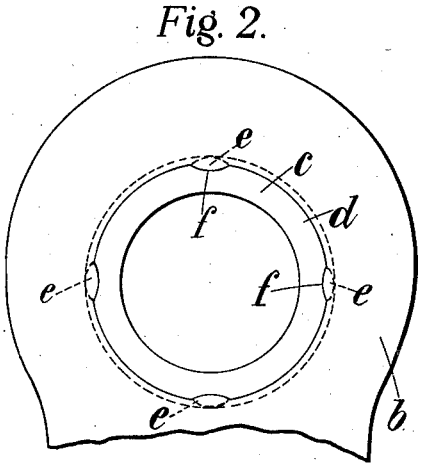
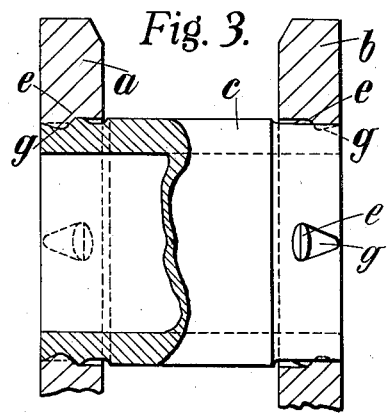
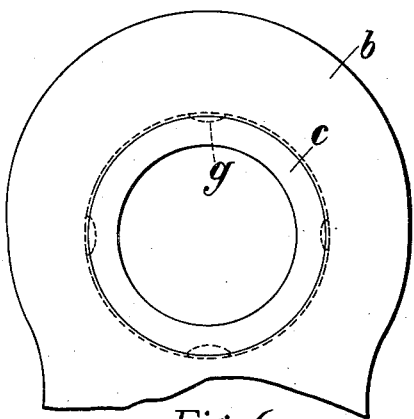
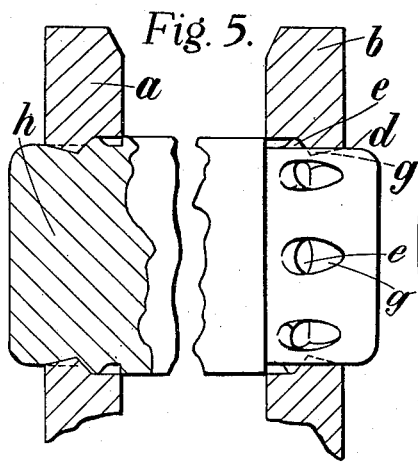
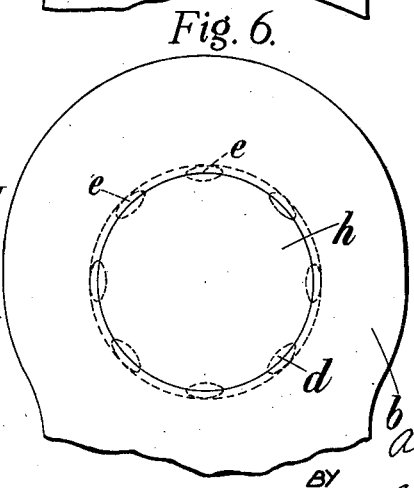
INVENTOR
Alfred Renshaw
BY
Gill & Jennings
ATTORNEYS.

Jan. 19, 1932.  A. RENSHAW  1,842,117
TRANSMISSION CHAIN
Filed June 21, 1928  2 Sheets-Sheet 2

INVENTOR
Alfred Renshaw
BY
Gill + Jennings
ATTORNEYS.

Patented Jan. 19, 1932

1,842,117

UNITED STATES PATENT OFFICE

ALFRED RENSHAW, OF DIDSBURY, MANCHESTER, ENGLAND, ASSIGNOR TO HANS RENOLD LIMITED, OF DIDSBURY, MANCHESTER, ENGLAND, A BRITISH COMPANY

TRANSMISSION CHAIN

Application filed June 21, 1928, Serial No. 287,319, and in Great Britain September 16, 1927.

This invention relates to transmission chains, and it is more particularly concerned with the fixing of side members, such as link plates or washers, to the joint members which connect successive links of such chains together. In the usual form of motor cycle chain, for example, the alternate inner links consist of two side plates connected together by two hollow bushes, whereas the intervening or outer links, which comprise a pair of outer link plates, in general are connected together by solid pins or rivets passing through the bore of the hollow bushes, although in some forms of chains such jointing pins are themselves in the form of hollow studs. The invention provides means, therefore, for securing such inner link plates to hollow bushes and such outer link plates to solid or hollow rivets or studs, but in addition, the invention may be generally applied to the securing of plates or like members to cylindrical jointing members, as, for example, the fixing of washers on to rivets.

The present invention aims at securing together such parts in a manner which prevents relative rotation between the side plates and bushes or studs, while avoiding any weakening of the bushes or studs and at the same time giving a bearing area, in the case of a hollow bush, equal to that in a chain of any standard design so as to increase the life of the chain without undue stretching, in comparison with chains in which the bearing area of the inner bore of the bush is interfered with.

According to the present invention then, the cylindrical jointing members of a transmission chain, such as pins or rivets or hollow bushes or solid studs, are formed with projections on their outer surface consisting of metal which has been displaced from the cylindrical surface so as to leave corresponding grooves or depressions, and the projections so formed are employed to cut or broach corresponding grooves or keyways in the plates or washers when the latter are forced on to their studs or bushes. The result is that during this latter operation, metal of the relatively soft plate or washer enters the recesses or depressions in the stud or bush to afford a double keying effect. It is preferred to make the cylindrical jointing members with true cylindrical surfaces capable of making a force fit within the holes in the plates or washers and to form the projections and recesses subsequently by a tooling operation which does not disturb the accuracy of shape and fit of the larger part of the cylindrical surfaces. As a matter of fact, the ends of the bushes or studs may be acted upon by scoring tools which press up the metal from their outer surfaces to form the upstanding projections which are distributed around the cylindrical surface, and when such tools score grooves inclined to the axes of the bushes or studs and metal from the side plate flows into those grooves when the plates are forced on to the bushes or studs, there is in addition to the keying effect preventing rotation of the parts, a positive fixing of the side plates or washers which prevents them from being withdraw axially from the bushes or studs.

In accordance with the present invention, the methods of securing the jointing members as set forth above can be employed in combination with the methods set forth in the specifications of United States patent applications Serial Nos. 163,347 filed January 25th 1927, 205,438 filed July 13th 1927 and 238,598 filed December 8th 1927, but such arrangement will be more fully described below.

In order that the invention may be more clearly understood and readily carried into effect, some examples of joints made in accordance with the invention will now be more fully described with reference to the accompanying drawings, wherein:

Figure 1 is an elevation partly in section showing the end of a pair of side plates connected together by a bush in accordance with the invention;

Figure 2 is an elevation of the same seen from the end of the bush;

Figures 3 and 4 are corresponding views showing a somewhat modified form of joint;

Figure 8:
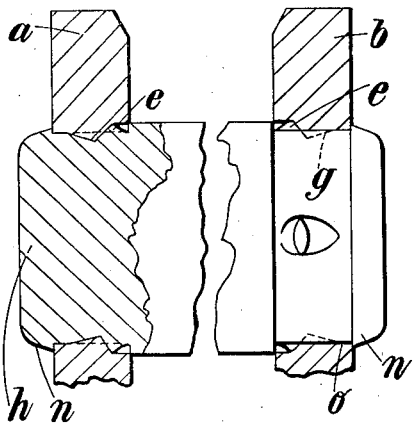
Figure 9:
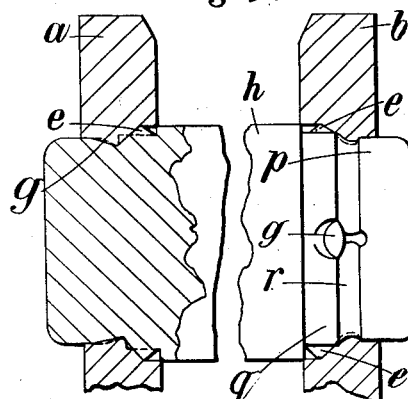
Figure 10:
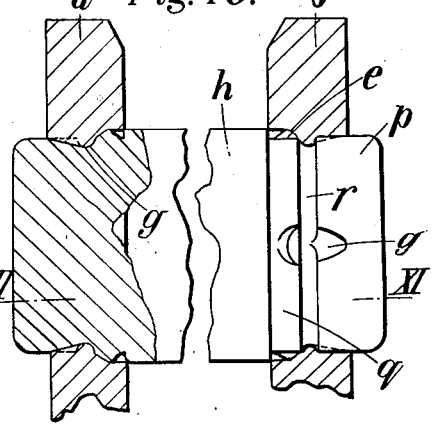
Figure 11:
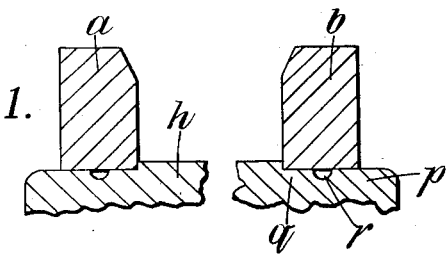

Figures 5 and 6 are views similar to Figures 1 and 2 but showing a form of joint similar to that shown in Figures 3 and 4 but applied to the securing of side plates upon solid pins or rivets;

Figures 7 to 10 are views similar to Figure 5 illustrating modified forms of joints; while Figure 11 is a section on the line XI—XI in Figure 10 showing the form of the rivet employed.

Referring first of all to Figures 1 and 2, the invention is shown as applied to the so-called inner combination of a sprocket chain, that is to say, to the elements each consisting of two side plates $a$, $b$ connected together by two hollow bushes, one of which is shown at $c$. In the construction shown in these figures, the bushes $c$ have reduced necks $d$ at both ends of an axial length substantially equal to the width of the side plates $a$ and $b$ so that, as seen in Figure 1, the bushes $c$ have their outer ends flush with the outer surfaces of the plates $a$ and $b$, although it is clear that instead the ends of the bushes $c$ could project beyond the outer surfaces of the plates $a$ and $b$. Keying projections $e$ are formed by causing a number of tools corresponding to the number of projections $e$ to move parallel to the axis of the bush $c$ to score the outer surface of the necks $d$ of the bushes $c$ near the ends and to push before them the metal so displaced to form the projections $e$. In actual practice, the bush $c$ may be placed in a shroud, which prevents the metal which is pushed up to form the projections $e$ from being pushed outwardly beyond the outer cylindrical surface of the body portion of the bush $c$, as clearly seen in Figure 1. The metal displaced from the surface of the bush $c$ to form the projections $e$ naturally leaves small grooves $f$ corresponding to each projection $e$ at the ends of the bush $c$. It is found that if a bush so formed is pressed into a circular hole in the relatively soft plate $a$ or $b$, such hole being formed with substantially the same diameter as the cylindrical surface of the necks $d$ at the ends of the bushes $c$ between the projections $e$ so that the cylindrical surface of the neck of the bush makes a force fit in the said hole in the side plate $a$ or $b$, the metal that is pressed from the side plates $a$, $b$ by the projections $e$ tends to flow into the grooves $f$ in front of the projections $e$ and so to fill up the grooves, as illustrated in Figure 2. It can be clearly appreciated, therefore, that by reason of this action there is a double keying effect, one effect being due to the projections $e$ engaging the keyways they have cut through the plates $a$ and $b$, and the second keying effect being due to the metal pushed forward from the side plate $a$ or $b$ and filling in the grooves $f$.

A preferred form of construction is, however, shown in Figures 3 and 4. The general form of joint is the same as in Figures 1 and 2, but is varied by the fact that the tools which press up the projections $e$ do not move parallel to the axis of the bush $c$, but as they come on to the end of the bush move inwards towards the axis, so that in this case grooves $g$ are left which are inclined to the axis, or in other words, become deeper as the metal is pushed away from the end of the bush $c$, as shown clearly in Figure 3. In this case also it is preferred to shroud the bush during the operation of forming the projections $e$, which prevents the latter from extending outwards beyond the outer surface of the body portion of the bush $c$. In this case, however, when the bush $c$ is assembled into the side plates $a$, $b$, the metal which is caused to flow forward from the side plates $a$, $b$ in front of the projections $e$ flows into the tapered recesses or grooves $g$, and in addition to the keying effect preventing relative rotation between the bush $c$ and the side plates $a$, $b$, the metal of the side plate engaging in the grooves $g$ obviously positively prevents the plates $a$, $b$ from being withdrawn from the bush $c$.

In the form of construction shown in Figures 5 and 6, a joint is employed which is substantially the same as that shown in Figures 3 and 4, but the arrangement is more properly adapted for securing side plates $a$ and $b$ upon a large solid rivet or stud $h$. The number of projections formed depends upon the diameter of the rivet $h$. In the case of the relatively small bushes shown in Figures 1 to 4, four projections are sufficient; in the case of the large rivets such as Figures 5 and 6 are intended to illustrate, it will be noted that there are eight projections $e$. Nevertheless, in spite of the increased number the remainder of the surface of the necks $d$ of the rivet $h$ is left true and forming a cylindrical bearing surface within the plates $a$, $b$. Apart from the above variations, it will be noticed that the ends of the stud $h$ project slightly beyond the outer faces of the plates $a$, $b$. The same advantages are present in the case of a solid stud, for by use of the inclined recesses or grooves $g$ there is the double keying effect due to the projections $e$ and the metal in the grooves $g$, and there is the positive holding on the plates $a$, $b$ from endwise movement.

Figure 7:
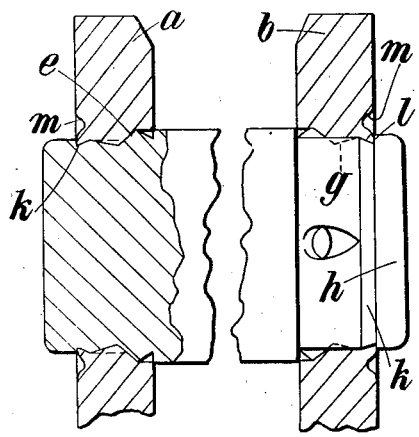

The remaining figures of the drawings illustrate modified forms of joint for securing side plates $a$, $b$ on to solid studs $h$, but in each case the studs are assumed to be of such a diameter as only to need four projections $e$ at either end. Referring more particularly to Figure 7, in addition to the formation of the projections $e$ as illustrated in Figures 5 and 6 and the forcing on of the plates $a$ and $b$ so that keyways are cut in these plates and the displaced metal takes up its position in the grooves $g$, the solid stud $h$ is formed at either end with an annular groove $k$ which, as shown, is of such a shape as to leave a definite shoulder $l$ at the outer end forming a slight head to the rivet. In finishing the joint, therefore, metal is forced into the grooves $k$ by a spinning or similar metal-displacing operation applied at the points $m$ as illustrated, in fact the metal is spun into the groove $k$ by pressing in the metal as shown. It will be seen that in addition to obtaining the compound keying effect in accordance with the present invention, the effectiveness of the joint is increased by an operation as set forth in the specification of United States patent application Serial No. 205,438.

In the further variant illustrated in Figure 8, the compound keying effect by means of the projections $e$ and recesses $g$ is obtained exactly as described in connection with Figures 5 to 7. An additional jointing action, however, is obtained in this case by forming slight heads $n$ to the stud $h$, the heads at their maximum diameter being slightly greater than the internal diameter of the holes in the plates $a$ and $b$. Therefore in forcing on the plates $a$ and $b$, there is elastic stretching of the metal of the plates, and when they reach their final position there is elastic recovery so that the plates take up their position in the definite grooves $o$ formed inside the heads $n$. It will be realized, in fact, that the plates $a, b$ are snapped into position in the grooves $o$ in the manner set forth in the specification of United States patent application Serial No. 163,347, and that the heads $n$ add to the positive effect of preventing endwise withdrawal of the plates $a, b$.

In the further form of joint illustrated in Figure 9, the rivet $h$ is formed with a neck at each end comprising two portions of different diameter, namely an outer portion $p$ of smaller diameter and an inner portion $q$ larger in diameter than the portion $p$ but of smaller diameter than the main body of the rivet $h$. The parts $p$ and $q$ are separated by an annular groove $r$. In this case the attack on the metal by the scoring tools forming the upstanding projections $e$ and the grooves $g$ into which the metal flows takes place in the vicinity of the annular groove $r$, so that this groove, in fact, is joined up with the grooves $g$. In this case when the plates $a, b$ are forced on to the rivet $h$, there is an action taking place as set forth in the specification of United States patent application Serial No. 238,598, namely the outer part $p$ of the necks makes a force fit in the holes in the plates $a$ or $b$ and enters the holes until the metal of the plates $a, b$ encounters the parts $q$ of increased diameter. The effect of these parts is to push or hold back metal from the holes in the plates $a$ and $b$, and so to fill up the annular grooves $r$. In addition, the projections $e$ pushed up by the scoring tools cut their keyways in the metal of the plates $a, b$ exactly as already described, and the metal pushed in front of them fills up the grooves $g$, which may be regarded in this case as local depressions in the annular grooves $r$.

In Figures 10 and 11 there is illustrated a construction closely related to that in Figure 9; in fact it may be regarded as a modification of the construction in Figure 9 wherein the outer parts $p$ and the inner parts $q$ of the necks of the ends of the rivet $h$ are of the same diameter. This is clearly shown in Figure 11, and from this figure it will be clearly seen that in effect each end of the rivet $h$ consists of a single neck on which is formed an annular groove $r$. In some respects this construction is hardly as efficient as that shown in Figure 9, inasmuch as there is no part of larger diameter to hold the metal back and fill up the grooves $r$. Nevertheless, the metal pushed forward by the projections $e$ again fills up the grooves $g$, which are actually local depressions in the groove $r$.

Although a number of forms of joints in accordance with the present invention have been described above and illustrated in the accompanying drawings, these examples naturally do not exhaust all the possibilities. It will already have been appreciated that the number of projections around one end of a stud or bush may be varied as long as there is left remaining a substantial bearing surface of cylindrical shape. Furthermore, all of the constructions shown in the drawings can be applied either to the fixing of hollow bushes or solid rivets or studs. In all cases where hollow bushes are employed, they may be turned or otherwise formed from solid metal or tubing, or they may be formed from flat plates by drawing, or may be formed by coiling from pieces of strip metal which have been rolled to an appropriate section. It will be realized also that the cylindrical jointing members may, if desired, have a joint as illustrated in any of the examples at one end, and may have a simpler joint at the opposite end, for example, a plain shoulder which may take various forms. As already indicated also, it will be understood that apart from the fixing of side plates of transmission chain links, the invention can be applied to other purposes, as for securing washers on the ends of hollow bushes or of solid studs. In any case, in practice the bushes or studs will be made of relatively harder material than the plates or washers to be fixed upon them.

I claim:—

1. The method of engaging a transmission chain jointing member with a plate which consists in displacing metal from the surface layer of said jointing member so as to leave spaced depressions and to form corresponding projections, forming a hole in said plate to fit the cylindrical surface of said jointing member and forcing said plate on to the end of said jointing member so that the projections cut keyways in said plate and metal therefrom enters said depressions.

2. The method of engaging a cylindrical jointing member with a plate of a transmission chain which consists in forming an end of said jointing member with a true cylindrical surface, displacing metal from the said surface to form depressions in said cylindrical surface and to push up metal to form corresponding projections while leaving the greater part of the cylindrical surface undisturbed, forming a hole in said plate to make a force fit on the end of said jointing member, and forcing said plate on to said jointing member so that the projections cut keyways in said plate and metal therefrom enters said depressions.

3. The method of engaging the cylindrical jointing members in the side plates of a transmission chain which consists in scoring grooves in an end of each of said jointing members, said grooves being inclined inwardly towards the axis thereof, displacing the metal removed from said grooves to form corresponding spaced projections and forcing apertured side plates on to said jointing members so that the projections cut or broach corresponding keyways in the side plates and metal therefrom enters said inclined grooves.

4. The method of engaging cylindrical jointing members with the side plates of a transmission chain which consists in forming an annular groove near an end of each of said jointing members, displacing metal from the cylindrical surface of each of said jointing members so as to form spaced projections and to make corresponding depressions, forcing said side plates on to said jointing members so that the projections cut corresponding keyways in said side plates and metal therefrom enters said depressions, and subsequently forcing metal of said side plates into said annular grooves.

5. A transmission chain comprising a plurality of links each consisting of a pair of cylindrical jointing members formed with depressions and associated projections spaced around their outer surfaces, each projection being at the inward end of a depression, and a pair of side plates at least one of which is formed with cylindrical holes which are a force fit on the jointing members and the sides of which, after the side plate has been assembled with the jointing members, have keyways fitting the aforesaid projections and projections fitting the depressions.

6. A transmission chain comprising a plurality of links each consisting of a pair of cylindrical jointing members formed on their outer surfaces with grooves inclined inwardly to the axes of said jointing members and with associated projections each at the inward end of a depression said grooves and projections being spaced around said outer surfaces, and a pair of side plates at least one of which is formed with cylindrical holes which are a force fit on the jointing members and the sides of which after the side plate has been assembled with the jointing members have keyways fitting the aforesaid projections and projections fitting the depressions.

7. A transmission chain element comprising a pair of cylindrical jointing members formed with depressions and associated projections, each projection at the inward end of a depression, spaced around their outer surfaces near the opposite ends thereof, and a pair of side plates each formed with cylindrical holes which are a force fit on the ends of the jointing members and the sides of which after the side plates have been assembled with opposite ends of the jointing members have keyways fitting the aforesaid projections and projections fitting the depressions.

8. A transmission chain comprising a plurality of links each consisting of a pair of cylindrical jointing members formed with depressions and associated projections spaced around their outer surfaces leaving substantial parts of said surfaces undisturbed, each projection being at the inward end of a depression, and a pair of side plates at least one of which is formed with cylindrical holes which are a force fit on the jointing members and the sides of which, after the side plate has been assembled with the jointing members, have keyways fitting the aforesaid projections and projections fitting the depressions.

9. A transmission chain element comprising a pair of hollow bushes formed with depressions and associated projections, each projection at the inward end of a depression, spaced around their outer surfaces near the opposite ends thereof, and a pair of side plates each formed with cylindrical holes which are a force fit on the ends of the hollow bushes and the sides of which after the side plates have been assembled with opposite ends of the hollow bushes have keyways fitting the aforesaid projections and projections fitting the depressions.

In witness whereof I hereunto subscribe my name this 8th day of June 1928.

ALFRED RENSHAW.